(12) United States Patent
Haida

(10) Patent No.: US 10,591,895 B2
(45) Date of Patent: Mar. 17, 2020

(54) INFORMATION PROCESSING APPARATUS, THREE-DIMENSIONAL FABRICATION APPARATUS, AND THREE-DIMENSIONAL FABRICATION SYSTEM

(71) Applicant: Kazuo Haida, Kanagawa (JP)

(72) Inventor: Kazuo Haida, Kanagawa (JP)

(73) Assignee: RICOH COMPANY, LTD., Tokyo (JP)

(\*) Notice: Subject to any disclaimer, the term of this patent is extended or adjusted under 35 U.S.C. 154(b) by 376 days.

(21) Appl. No.: 15/390,798

(22) Filed: Dec. 27, 2016

(65) Prior Publication Data

US 2017/0185069 A1    Jun. 29, 2017

(30) Foreign Application Priority Data

Dec. 28, 2015 (JP) .................. 2015-257267

(51) Int. Cl.
*G05B 19/4097* (2006.01)
*H04N 1/46* (2006.01)
*B33Y 30/00* (2015.01)
*B29C 64/386* (2017.01)
*B33Y 50/02* (2015.01)

(52) U.S. Cl.
CPC .......... *G05B 19/4097* (2013.01); *B33Y 30/00* (2014.12); *H04N 1/46* (2013.01); *B29C 64/386* (2017.08); *B33Y 50/02* (2014.12); *G05B 2219/49023* (2013.01)

(58) Field of Classification Search
CPC .... G05B 19/4097; B33Y 30/00; B33Y 50/02; H04N 1/46; B29C 64/386; G06B 2219/49023

USPC .......................................................... 382/154
See application file for complete search history.

(56) References Cited

U.S. PATENT DOCUMENTS

| 2004/0183796 | A1* | 9/2004 | Velde ................ B41C 1/00 345/419 |
| 2011/0222734 | A1 | 9/2011 | Angot et al. |
| 2012/0163733 | A1 | 6/2012 | Yoon et al. |
| 2013/0021627 | A1 | 1/2013 | Murata |

(Continued)

FOREIGN PATENT DOCUMENTS

| EP | 2573508 A1 | 3/2013 |
| JP | 2000-172885 A | 6/2000 |

(Continued)

OTHER PUBLICATIONS

Extended European Search Report dated May 17, 2017.
(Continued)

*Primary Examiner* — Jonathan S Lee
(74) *Attorney, Agent, or Firm* — Harness, Dickey & Pierce, P.L.C.

(57) ABSTRACT

An information processing apparatus includes a display control unit, a receiving unit, a selecting unit, and a height-information setting unit. The display control unit displays image data on a display unit. The receiving unit receives specification of an arbitrary point on the displayed image data and specification of a color range in a three-dimensional color space that is based on the arbitrary point. The selecting unit selects a region having color included in the specified color range on the image data. The height-information setting unit sets height information to the selected region.

20 Claims, 14 Drawing Sheets

(56) References Cited

U.S. PATENT DOCUMENTS

| | | | |
|---|---|---|---|
| 2013/0089239 A1 | 4/2013 | Ikeda et al. | |
| 2015/0352839 A1* | 12/2015 | Folkins | B33Y 50/02 347/14 |
| 2016/0001504 A1* | 1/2016 | Ikeda | B29C 67/0059 264/255 |
| 2016/0305767 A1* | 10/2016 | Sano | B41J 2/2103 |
| 2017/0087772 A1* | 3/2017 | Hakkaku | B33Y 40/00 |
| 2018/0043680 A1* | 2/2018 | Ochi | B29C 64/194 |

FOREIGN PATENT DOCUMENTS

| | | | |
|---|---|---|---|
| JP | 2005-128774 A | 5/2005 | |
| JP | 2005-229189 A | 8/2005 | |
| JP | 4337571 | 7/2009 | |

OTHER PUBLICATIONS

Carsten, R. et al., "GrabCut," ACM Transaction on Graphics, vol. 23, No. 3, pp. 309-314, Aug. 1, 2004.
Japanese Office Action dated Nov. 5, 2019.

\* cited by examiner

| GRADATION VALUE | HEIGHT |
|---|---|
| 000-000 | 0 |
| 001-009 | 24 |
| 010-019 | 47 |
| 020-029 | 70 |
| 030-039 | 94 |
| 040-049 | 117 |
| 050-059 | 140 |
| 060-069 | 163 |
| 070-079 | 187 |
| 080-089 | 210 |
| 090-100 | 233 |

FIRST LAYER DATA

THIRD LAYER DATA
SECOND LAYER DATA
FIRST LAYER DATA

THIRD LAYER DATA

SECOND LAYER DATA

FIRST LAYER DATA

FOURTH LAYER DATA (COLOR ONLY)

THIRD LAYER DATA

SECOND LAYER DATA

FIRST LAYER DATA

INFORMATION PROCESSING APPARATUS, THREE-DIMENSIONAL FABRICATION APPARATUS, AND THREE-DIMENSIONAL FABRICATION SYSTEM

CROSS-REFERENCE TO RELATED APPLICATIONS

The present application claims priority under 35 U.S.C. § 119 to Japanese Patent Application No. 2015-257267, filed on Dec. 28, 2015. The contents of which are incorporated herein by reference in their entirety.

BACKGROUND OF THE INVENTION

1. Field of the Invention

The present invention relates to an information processing apparatus, a three-dimensional fabrication apparatus, and a three-dimensional fabrication system.

2. Description of the Related Art

Conventionally, as a method of fabricating a three-dimensional object, an inkjet method, fused deposition modeling, a rapid prototyping method, an inkjet binder method, a stereolithography, and selective laser sintering have been known. According to these three-dimensional fabrication methods, it is normal to fabricate a three-dimensional object by using three-dimensional shape information indicating a three-dimensional shape of the three-dimensional object to be fabricated.

As a method of generating the three-dimensional shape information described above, there are a method of generating the three-dimensional shape information by measuring an object that becomes a sample of a three-dimensional object to be fabricated, a method of generating the three-dimensional shape information based on three-dimensional image data indicating a three-dimensional object to be fabricated, and a method of generating the three-dimensional shape information by adding height information to two-dimensional image data indicating a three-dimensional object to be fabricated.

For example, Japanese Patent No. 4,337,571 discloses a method in which a hue range is specified with respect to two-dimensional image data, a region included in the specified hue range is extracted from the two-dimensional image data, and transfer density corresponding to the hue in the region is set with respect to the extracted region so as to add height information to the two-dimensional image data.

According to the technique disclosed in Japanese Patent No. 4,337,571, it is necessary to specify the hue range so that a region to which a user wishes to add the height information is extracted from the two-dimensional image data.

However, according to the technique disclosed in Japanese Patent No. 4,337,571, the hue range is specified by using data of a general hue circle without using color on the two-dimensional image data. That is, in the technique disclosed in Japanese Patent No. 4,337,571, the user himself/herself predicts the hue range in the region to which it is desired to add the height information and specifies the predicted hue range by using the general hue circle data.

Therefore, in the technique disclosed in Japanese Patent No. 4,337,571, it is difficult to approximate the specified hue range initially to the hue range in the region to which it is desired to add the height information, and it is difficult to extract the region to which it is desired to add the height information easily.

SUMMARY OF THE INVENTION

According to one aspect of the present invention, an information processing apparatus includes a display control unit, a receiving unit, a selecting unit, and a height-information setting unit. The display control unit displays image data on a display unit. The receiving unit receives specification of an arbitrary point on the displayed image data and specification of a color range in a three-dimensional color space that is based on the arbitrary point. The selecting unit selects a region having color included in the specified color range on the image data. The height-information setting unit sets height information to the selected region.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
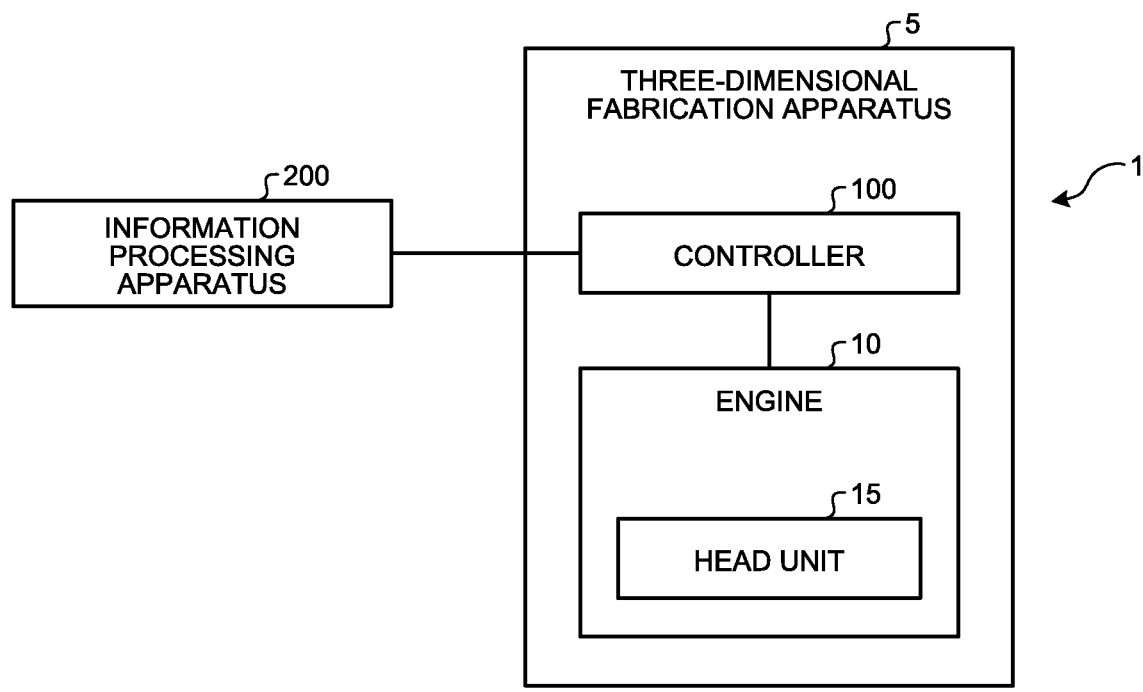
FIG. 1 is a block diagram illustrating an example of a schematic configuration of a three-dimensional fabrication system according to an embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An object of an embodiment is to provide an information processing apparatus that can easily select a region to which it is desired to set height information on image data.

Embodiments of an information processing apparatus, a three-dimensional fabrication apparatus, and a three-dimensional fabrication system according to the present invention will be explained below in detail with reference to the accompanying drawings. An inkjet recording apparatus that fabricates a three-dimensional image on a recording medium by discharging ultraviolet curable ink (active energy-line curable ink) as a fabrication agent from a piezo inkjet head with respect to a recording medium is described as an example of a three-dimensional fabrication apparatus. However, the three-dimensional fabrication apparatus is not limited thereto.

The recording medium can be any medium so long as it can fabricate a three-dimensional image, and for example, recording paper and canvas can be mentioned. However, the recording medium is not limited thereto. Further, the fabrication agent is not limited to the ultraviolet curable ink, and any fabrication agent can be used so long as it can acquire shape stability without being mixed with other fabrication agents after layering is complete. The fabrication agent can be a liquid or gel form at the time of layering. The fabrication agent can be ink that softens or cures naturally or by heat.

FIG. 1 is a block diagram illustrating an example of a schematic configuration of a three-dimensional fabrication system 1 according to the present embodiment. As illustrated in FIG. 1, the three-dimensional fabrication system 1 includes a three-dimensional fabrication apparatus 5 and an information processing apparatus 200. The three-dimensional fabrication apparatus 5 and the information processing apparatus 200 can be connected in any connection mode, and for example, can be connected via a network or by using a communication cable or the like.

As illustrated in FIG. 1, the three-dimensional fabrication apparatus 5 includes an engine 10 and a controller 100.

The engine 10 fabricates (forms) a three-dimensional image on a recording medium. Specifically, ultraviolet curable ink is discharged from a head unit 15 provided in the engine 10 and layered on the recording medium to fabricate the three-dimensional image on the recording medium.

The controller 100 executes control for fabricating (forming) a three-dimensional image on a recording medium. Specifically, the controller 100 generates information for fabricating a three-dimensional image, and causes the engine 10 to fabricate the three-dimensional image based on the generated information.

Figure 2:
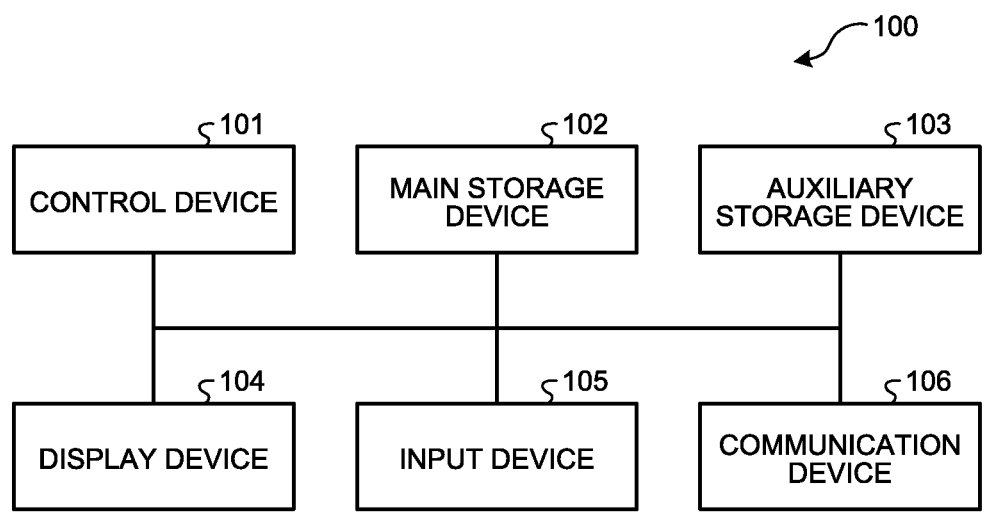
FIG. 2 is a block diagram illustrating an example of a hardware configuration of a controller according to the embodiment.

FIG. 2 is a block diagram illustrating an example of a hardware configuration of the controller 100 according to the present embodiment. As illustrated in FIG. 2, the controller 100 includes a control device 101 such as a central processing unit (CPU), a main storage device 102 such as a read only memory (ROM) and a random access memory (RAM), an auxiliary storage device 103 such as a hard disk drive (HDD) or a solid state drive (SSD), a display device 104 such as a display, an input device 105 such as a touch panel or a key switch, and a communication device 106 such as a communication interface. The controller 100 has a hardware configuration using a normal computer.

Figure 3:
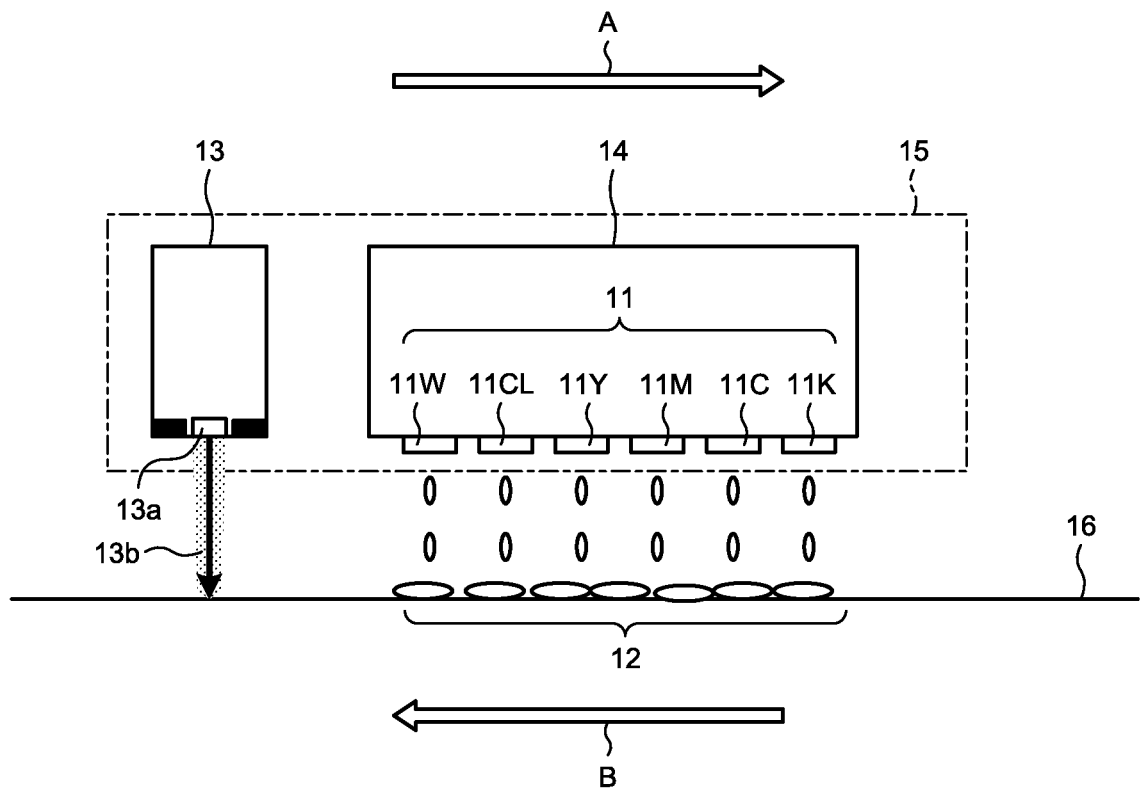
FIG. 3 is a schematic diagram illustrating an example of a mechanical configuration of a head unit according to the embodiment.

FIG. 3 is a schematic diagram illustrating an example of a mechanical configuration of the head unit 15 according to the present embodiment. As illustrated in FIG. 3, the head unit 15 includes an inkjet head 14 and an ultraviolet irradiation device 13.

The inkjet head 14 includes a nozzle array 11 that discharges the ultraviolet curable ink to a recording medium 16. In FIG. 3, the nozzle array 11 includes a nozzle 11W that discharges white (W) ultraviolet curable ink, a nozzle 11CL that discharges clear (CL) ultraviolet curable ink, a nozzle 11Y that discharges yellow (Y) ultraviolet curable ink, a nozzle 11M that discharges magenta (M) ultraviolet curable ink, a nozzle 11C that discharges cyan (C) ultraviolet curable ink, and a nozzle 11K that discharges black (K) ultraviolet curable ink is exemplified. However, the configuration of the nozzle array 11 is not limited thereto. For example, the nozzle array 11 does not have to necessarily include the nozzle 11CL. The number of nozzles 11W, 11CL, 11Y, 11C, 11M, and 11K can be any number so long as the number of each nozzle is equal to or more than one.

Among the ultraviolet curable ink, the white (W) ink and the clear (CL) ink are used for fabricating a shape of a three-dimensional image, and the yellow (Y) ink; the cyan (C) ink, the magenta (M) ink, and the black (K) ink are used for forming colors of the three-dimensional image. The details thereof are described later.

The ultraviolet irradiation device 13 includes an irradiating unit 13a that irradiates ultraviolet curable ink 12 layered on the recording medium 16 by the inkjet head 14 with a curing light 13b, which is ultraviolet ray. The ultraviolet curable ink 12 layered on the recording medium 16 is cured by the curing light 13b emitted from the ultraviolet irradiation device 13.

In the present embodiment, the recording medium 16 is conveyed in a direction of an arrow B (a sub-scanning direction). When the recording medium 16 is conveyed to a predetermined position, conveyance of the recording medium 16 is stopped, to start discharge of the ultraviolet curable ink by the inkjet head 14 to the recording medium 16.

Specifically, the head unit 15 reciprocates in a main-scanning direction orthogonal to the sub-scanning direction, while moving in a direction of an arrow A (the sub-scanning direction), and causes the inkjet head 14 to discharge the ultraviolet curable ink to the recording medium 16 (specifically, to a drawing region of the recording medium 16) and causes the ultraviolet irradiation device 13 to emit the curing light 13*b*.

When the ultraviolet curable ink is layered for one layer on the recording medium 16, the head unit 15 moves to an original position to repeat the above operation until the ultraviolet curable ink for n (n≥2) layers is layered.

When the ultraviolet curable ink for the n layers has been layered on the recording medium 16 and the three-dimensional image has been fabricated, conveyance of the recording medium 16 in the direction of the arrow B is restarted, and the recording medium 16 having the three-dimensional image fabricated thereon is output from the three-dimensional fabrication apparatus 5.

However, the discharge operation of the head unit 15 is not limited to the above method. For example, in a state with the head unit 15 being fixed, the recording medium 16 (specifically, a table unit or the like with the recording medium 16 fixed thereon) is reciprocated in the main-scanning direction orthogonal to the sub-scanning direction, while being conveyed in the direction of the arrow B, and the head unit 15 can cause the inkjet head 14 to discharge the ultraviolet curable ink to the recording medium 16 and the ultraviolet irradiation device 13 to irradiate the curing light 13*b*. In this case, when the ultraviolet curable ink for one layer has been layered on the recording medium 16, the above operation is repeated until the recording medium 16 is conveyed to the original position and the ultraviolet curable ink 12 for the n (n≥2) layers has been layered.

Referring back to FIG. 1, the information processing apparatus 200 generates height information indicating the height of the three-dimensional image for each pixel, and can be a terminal device such as a personal computer (PC), for example. The height information is used for fabricating the shape of the three-dimensional image.

Figure 4:
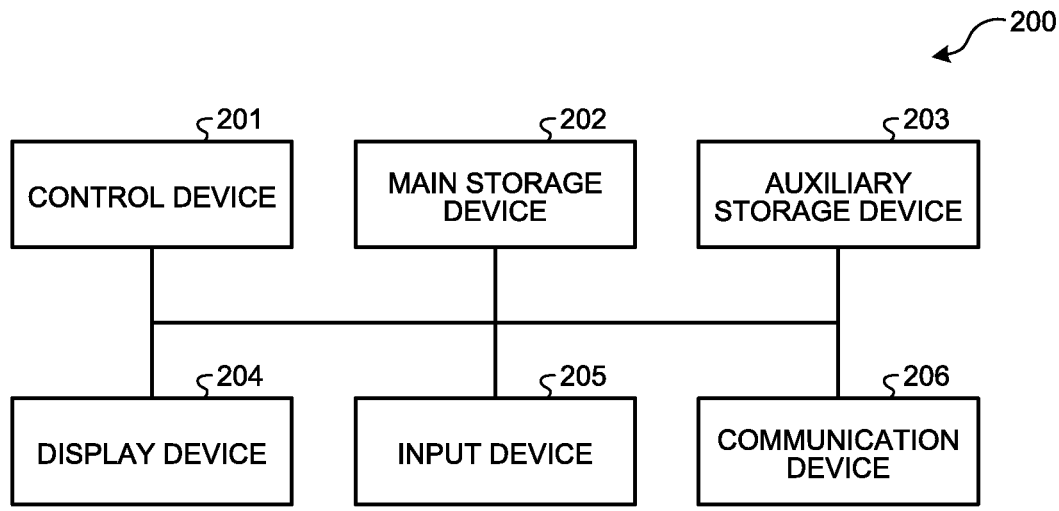
FIG. 4 is a block diagram illustrating an example of a hardware configuration of an information processing apparatus according to the embodiment.

FIG. 4 is a block diagram illustrating an example of a hardware configuration of the information processing apparatus 200 according to the present embodiment. As illustrated in FIG. 4, the information processing apparatus 200 includes a control device 201 such as a CPU, a main storage device 202 such as a ROM and a RAM, an auxiliary storage device 203 such as an HDD or an SSD, a display device 204 such as a display (an example of a display unit), an input device 205 such as a touch panel or a key switch, and a communication device 206 such as a communication interface. The information processing apparatus 200 has a hardware configuration using a normal computer.

Figure 5:
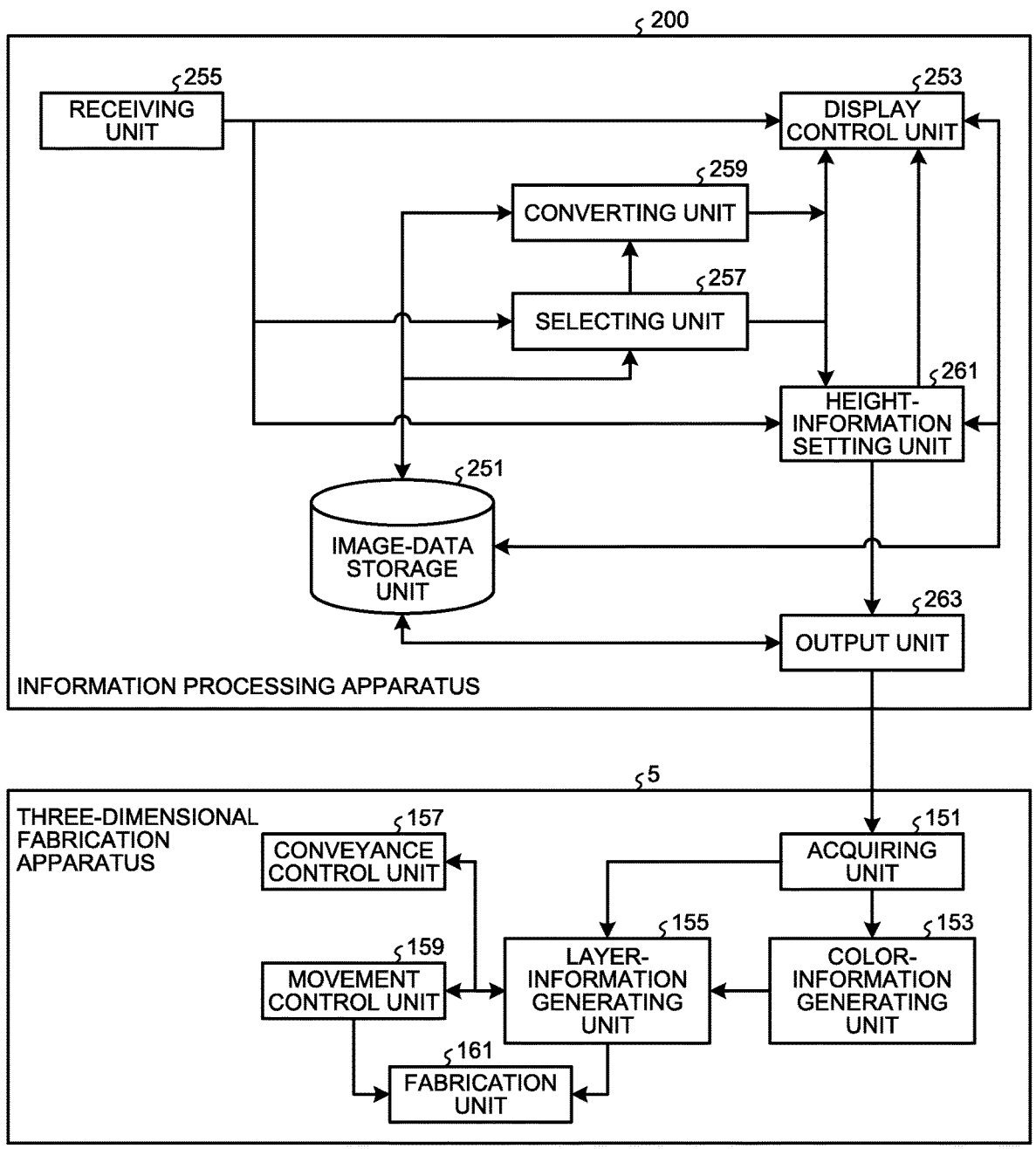
FIG. 5 is a block diagram illustrating an example of a functional configuration of the three-dimensional fabrication system according to the embodiment.

FIG. 5 is a block diagram illustrating an example of a functional configuration of the three-dimensional fabrication system 1 according to the present embodiment. As illustrated in FIG. 5, the information processing apparatus 200 includes an image-data storage unit 251, a display control unit 253, a receiving unit 255, a selecting unit 257, a converting unit 259, a height-information setting unit 261, and an output unit 263. As illustrated in FIG. 5, the three-dimensional fabrication apparatus 5 includes an acquiring unit 151, a color-information generating unit 153, a layer-information generating unit 155, a conveyance control unit 157, a movement control unit 159, and a fabrication unit 161.

The image-data storage unit 251 can be implemented by, for example, the main storage device 202 or the auxiliary storage device 203. The display control unit 253, the receiving unit 255, the selecting unit 257, the converting unit 259, and the height-information setting unit 261 can be implemented by, for example, the control device 201 and the main storage device 202. The output unit 263 can be implemented by, for example, the control device 201, the main storage device 202, and the communication device 206.

The acquiring unit 151 can be implemented by, for example, the control device 101, the main storage device 102, and the communication device 106. The color-information generating unit 153, the layer-information generating unit 155, and the conveyance control unit 157 can be implemented by, for example, the control device 101 and the main storage device 102. The movement control unit 159 and the fabrication unit 161 can be implemented by, for example, the head unit 15.

The image-data storage unit 251 stores therein image data of a three-dimensional image. For example, the image data of the three-dimensional image can be image data obtained by imaging a three-dimensional object reproduced by a three-dimensional image (that becomes a model of the three-dimensional image). For example, if the three-dimensional object to be reproduced by the three-dimensional image is a drawing, the image data of the three-dimensional image can be image data obtained by imaging the drawing. In the present embodiment, a case where the image data of the three-dimensional image is RGB image data is described as an example. However, the image data is not limited thereto, and, for example, the image data of the three-dimensional image can be YMCK image data.

Figure 6:
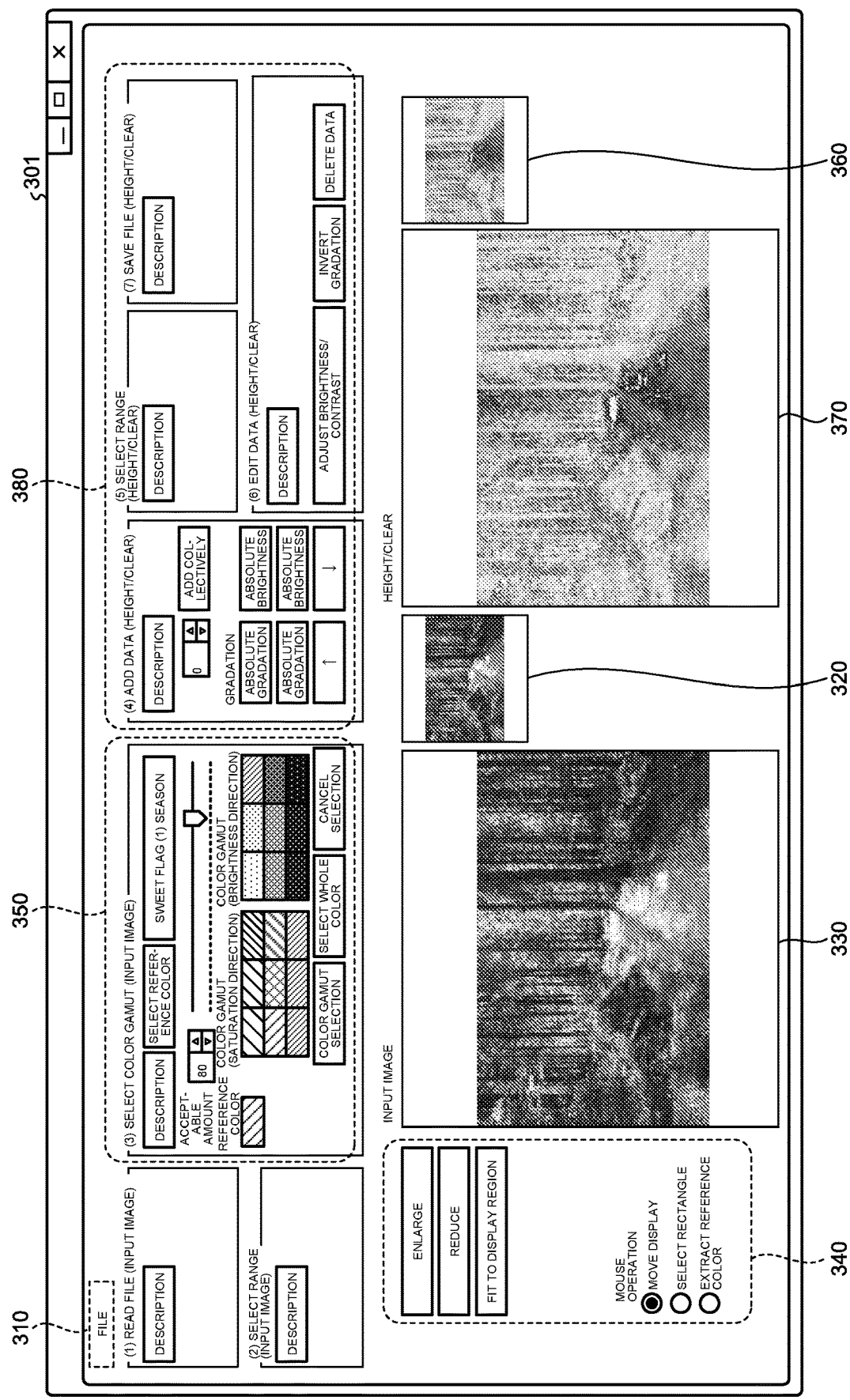
FIG. 6 is a diagram illustrating an example of a screen for generating height information according to the embodiment.

The display control unit 253 displays various screens on the display device 204. In the present embodiment, the display control unit 253 displays on the display device 204 a screen for generating the height information indicating the height of the three-dimensional image for each pixel from the image data of the three-dimensional image stored in the image-data storage unit 251. For example, the display control unit 253 displays a screen 301 as illustrated in FIG. 6 on the display device 204.

Operations of the display control unit 253, the receiving unit 255, the selecting unit 257, the converting unit 259, and the height-information setting unit 261 are described with reference to the screen 301 illustrated in FIG. 6.

The receiving unit 255 receives various operation inputs from the input device 205. Specifically, the receiving unit 255 receives information (a signal) corresponding to an operation of a user performed with respect to the input device 205, from the input device 205.

The receiving unit 255 receives specification of image data of the three-dimensional image for which the height information is to be generated. For example, when the user performs an operation of selecting a "file" button arranged in a region 310 on the screen 301 by using the input device 205 to specify the image data (a file) of the three-dimensional image for which the height information is to be generated, the receiving unit 255 receives specification of the image data of the three-dimensional image for which the height information is to be generated.

In this case, the display control unit 253 displays the image data of the three-dimensional image on the display device 204. For example, upon reception of specification of the image data of the three-dimensional image for which the height information is to be generated by the receiving unit 255, the display control unit 253 displays the specified image data in regions 320 and 330 on the screen 301.

The receiving unit 255 can receive specification of a partial region in the image data displayed on the display device 204. For example, when the user performs an operation of selecting "select rectangle" arranged in a region 340 on the screen 301 to specify a rectangle with respect to the image data displayed in the region 330, the receiving unit 255 receives specification of the rectangle as the specification of a partial region in the image data.

In this case, the display control unit 253 displays the specified partial region on the display device 204. For example, when the receiving unit 255 receives specification of a partial region in the image data, the display control unit 253 displays the specified partial region in the region 330. That is, the image data displayed in the region 330 is replaced with the image data in a portion corresponding to the specified partial region. At this time, the partial region is displayed, while matching the size of the region 330.

For example, when the user performs an operation of selecting "enlarge" arranged in the region 340 on the screen 301 by using the input device 205, the receiving unit 255 receives the operation, and the display control unit 253 enlarges the image data displayed in the region 330 and displays the image data.

Similarly, for example, when the user performs an operation of selecting "reduce" arranged in the region 340 on the screen 301 by using the input device 205, the receiving unit 255 receives the operation, and the display control unit 253 reduces the image data displayed in the region 330 and displays the image data.

The receiving unit 255 also receives specification of an arbitrary point on the image data displayed on the display device 204. For example, when the user performs an operation of specifying an arbitrary point in a region to which it is desired to add the height information, in the image data displayed in the region 330 on the screen 301 by using the input device 205, the receiving unit 255 receives specification of the arbitrary point.

In this case, the display control unit 253 displays the color in a three-dimensional color space corresponding to the specified arbitrary point on the display device 204. For example, the display control unit 253 displays the color in the three-dimensional color space corresponding to the specified arbitrary point as a reference color in a region 350 on the screen 301. The three-dimensional color space can be any color space, and for example, a Lab color space, an HSV color space, and an RGB color space can be mentioned. However, the three-dimensional color space is not limited thereto.

The receiving unit 255 receives specification of a color range in the three-dimensional color space that is based on the specified arbitrary point. For example, when the user operates a slider displayed in the region 350 on the screen 301 or selects a palette of saturation or brightness displayed in the region 350 on the screen 301 by using the input device 205, the receiving unit 255 receives specification of the color range in the three-dimensional color space that is adjusted based on the color (reference color) in the three-dimensional color space corresponding to the specified arbitrary point.

It is assumed that the color range in the three-dimensional color space to be specified is a color range including the color in the three-dimensional color space corresponding to the specified arbitrary point. However, the color range is not limited thereto, and the color range in the three-dimensional color space can be a color range not including the color in the three-dimensional color space corresponding to the specified arbitrary point.

In this case, the selecting unit 257 selects a region having the color included in the specified color range on the image data of the three-dimensional image. The converting unit 259 converts gradation of the image data of the three-dimensional image to generate gradation-converted image data so that a gradation value in the region selected by the selecting unit 257 becomes high. For example, the converting unit 259 performs gray scale conversion with respect to the image data of the three-dimensional image so that a gradation value of the color included in the region selected by the selecting unit 257 becomes high and a gradation value of the color included in the region not selected by the selecting unit 257 becomes low. Because the gray scale conversion so as to increase the gradation value of a specific color is a known technique, detailed descriptions thereof will be omitted.

The display control unit 253 displays the gradation-converted image data generated by the converting unit 259 on the display device 204. For example, the display control unit 253 displays the gradation-converted image data corresponding to the image data displayed in the region 320 on the screen 301, in a region 360 on the screen 301, and displays the gradation-converted image data corresponding to the image data displayed in the region 330 on the screen 301, in a region 370 on the screen 301.

The gradation-converted image data to be displayed in the regions 360 and 370 can be two-dimensional display or three-dimensional display. However, the three-dimensional display is more preferable. The gradation-converted image data to be displayed in the regions 360 and 370 can be color display or monochrome color display.

The height-information setting unit 261 sets the height information to the region selected by the selecting unit 257. In the present embodiment, three methods described below are described as examples of a method of setting the height information. However, the method of setting the height information is not limited to these methods. These three methods may not be used individually, and can be combined together.

In a first method, the receiving unit 255 receives specification of an apex of a region selected by the selecting unit 257 on the gradation-converted image data displayed on the display device 204, and receives specification of the height of the apex. For example, when the user performs an operation of specifying the apex in the region selected by the selecting unit 257 in the gradation-converted image data displayed in the region 370 on the screen 301 by using the input device 205, the receiving unit 255 receives specification of the apex. When the user performs an operation of specifying the height of the specified apex by a spin button displayed in a region 380 on the screen 301 by using the input device 205, the receiving unit 255 receives specification of the height of the apex.

In this case, the height-information setting unit 261 sets the height information to the region selected by the selecting unit 257 based on a first height-deciding logic for deciding the height around the apex based on the height of the specified apex.

The first height-deciding logic, for example, can be a logic to decide the height around the apex according to a ratio between the height of the apex and a distance to the apex (a distance on a plane). In this case, if the first height-deciding logic is a linear logic, the height of the region selected by the selecting unit 257 forms a pyramid shape, and the shape becomes steeper as the height of the apex becomes higher. However, the first height-deciding logic is not limited to the linear logic, and can be a non-linear logic.

Figure 7:
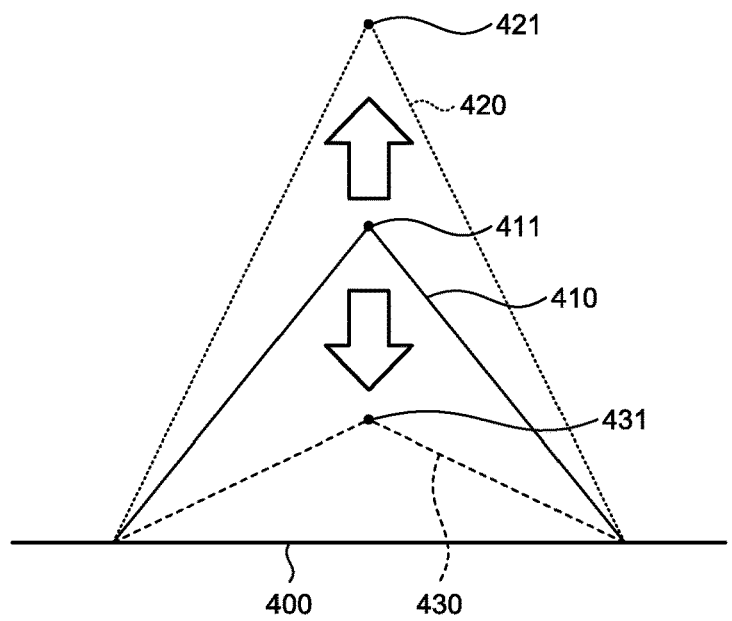
FIG. 7 is an explanatory diagram of an example of a height-information setting method according to the embodiment.
Figure 8:
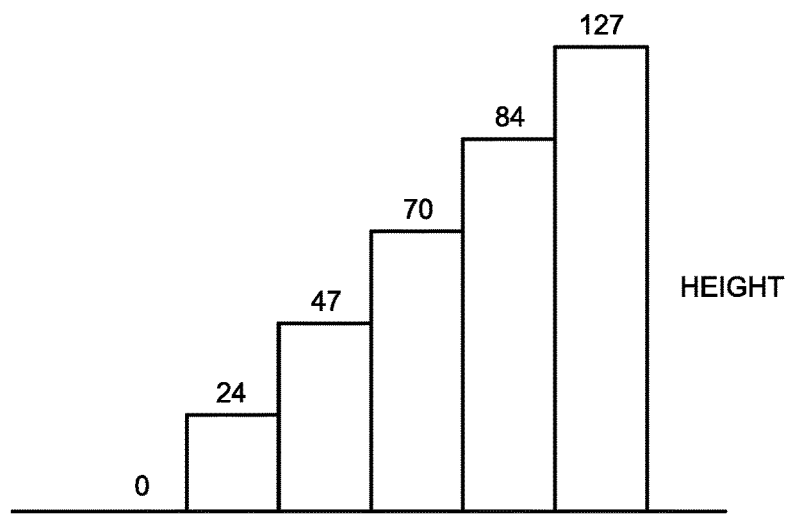
FIG. 8 is an explanatory diagram of an example of the height-information setting method according to the embodiment.

For example, as illustrated in FIG. 7, it is assumed that an apex 411 is specified with respect to a region 400 selected by the selecting unit 257, and "127" is specified as the height of the apex 411. It is also assumed that the region 400 is a circular region. In this case, when using the first height-deciding logic, the height-information setting unit 261 sets the height as illustrated in FIG. 8 with respect to the region 400 so that the height of the region 400 forms a circular cone 410. In FIG. 8, it is indicated that the height of the apex 411 is "127" and the height becomes lower as the distance on the plane from the apex 411 becomes longer.

Figure 9:
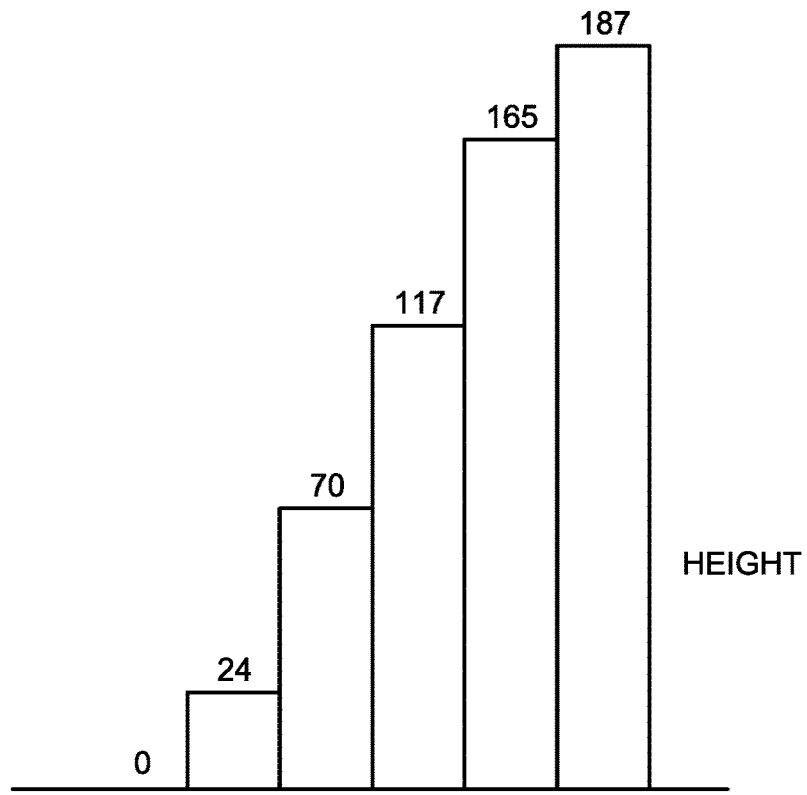
FIG. 9 is an explanatory diagram of an example of the height-information setting method according to the embodiment.

As illustrated in FIG. 7, it is assumed that an apex 421 is specified and "187" is specified as the height of the apex 421 with respect to the region 400 selected by the selecting unit 257. In this case, when using the first height-deciding logic, the height-information setting unit 261 sets the height illustrated in FIG. 9 so that the height of the region 400 forms a circular cone 420. In FIG. 9, it is indicated that the height of the apex 421 is "187" and the height becomes lower as the distance on the plane from the apex 421 becomes longer.

Figure 10:
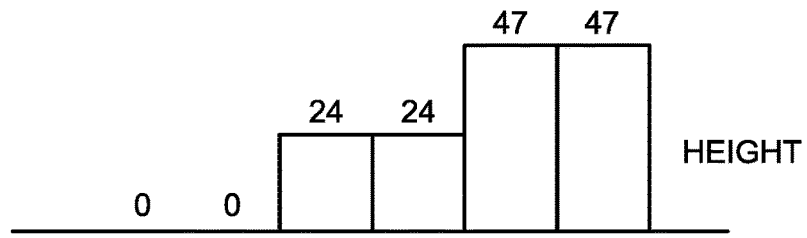
FIG. 10 is an explanatory diagram of an example of the height-information setting method according to the embodiment.

As illustrated in FIG. 7, it is assumed that an apex 431 is specified and "47" is specified as the height of the apex 431 with respect to the region 400 selected by the selecting unit 257. In this case, when using the first height-deciding logic, the height-information setting unit 261 sets the height as illustrated in FIG. 10 so that the height of the region 400 forms a circular cone 430. In FIG. 10, it is indicated that the height of the apex 431 is "47" and the height becomes lower as the distance on the plane from the apex 431 becomes longer.

In this manner, in the first height-deciding logic, as is obvious from comparison of FIGS. 8 to 10 or the circular cones 410 to 430, an inclination of the cone becomes steeper as the height of the apex becomes higher, and the inclination of the cone becomes gentler as the height of the apex becomes lower.

In a second method, the receiving unit 255 receives an operation of setting the height information to the region selected by the selecting unit 257 according to a second height-deciding logic. In this case, the height-information setting unit 261 sets the height information to the region selected by the selecting unit 257 based on the second height-deciding logic for deciding the height corresponding to an arbitrary gradation value.

Figures 11, 12:
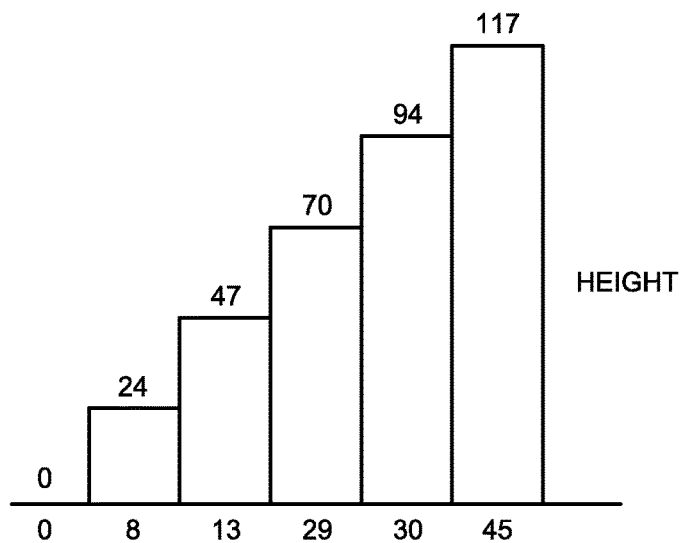
FIG. 11 is an explanatory diagram of an example of the height-information setting method according to the embodiment.
FIG. 12 is an explanatory diagram of an example of the height-information setting method according to the embodiment.

The second height-deciding logic, for example, can be a logic to decide a higher height as the gradation value becomes higher. For example, the height-information setting unit 261 sets the height corresponding to the gradation value to each pixel in the region selected by the selecting unit 257, by using a table in which the gradation value and the height are associated with each other as illustrated in FIG. 11. In this case, the height as illustrated in FIG. 12 is set according to the gradation value.

In a third method, the receiving unit 255 receives specification of the height with respect to the region selected by the selecting unit 257. For example, when the user performs the operation of specifying the height by using the spin button displayed in the region 380 on the screen 301 to select an "add collectively" button, the receiving unit 255 receives specification of the height with respect to the region selected by the selecting unit 257.

In this case, the height-information setting unit 261 sets the height information indicating the height specified for the whole of the region selected by the selecting unit 257. In this method, the height of the region selected by the selecting unit 257 forms a cylinder.

The display control unit 253 adds the height information set by the height-information setting unit 261 to the gradation-converted image data displayed in the region 360 and the gradation-converted image data displayed in the region 370 and displays the gradation-converted image data. In the case of two-dimensional display, the height is expressed by dark or light in color (for example, the height is higher as the color is darker, and the height is lower as the color is lighter). In the case of three-dimensional display, it is sufficient to express the height indicated by the set height information in three dimensions.

The selecting unit 257 selects the region on the image data each time the receiving unit 255 receives specification of a color range, and the height-information setting unit 261 repeats the operation of setting the height information to the selected region each time the selecting unit 257 selects the region.

The display control unit 253 displays a specified partial region each time the receiving unit 255 receives specification of the partial region. The receiving unit 255 receives specification of the arbitrary point and specification of the color range on the displayed partial region, each time the display control unit 253 displays the partial region. The selecting unit 257 selects the region on the partial region each time the receiving unit 255 receives specification of the color range. The height-information setting unit 261 repeats the operation of setting the height information to the selected region each time the selecting unit 257 selects the region.

If there are a plurality of partial regions each including a region set with the height information, the height-information setting unit 261 integrates the pieces of height information set to the partial regions at an arbitrary timing. The arbitrary timing can be a timing at which setting of the height information to a new partial region is complete, that is, each time setting of the height information to the partial region is complete; or alternatively, a timing at which setting of the height information to all the partial regions is complete, that is, when setting of the height information to all the partial regions is complete.

Thereafter, for example, when a "file" button arranged in the region 310 on the screen 301 is selected and a saving operation of the height information is performed, the height information is saved.

The output unit 263 outputs height information set to image data of a three-dimensional image to the three-dimensional fabrication apparatus 5. In the present embodiment, when acquisition of the image data and the height information of the three-dimensional image is requested from the three-dimensional fabrication apparatus 5, the output unit 263 outputs the image data and the height information of the three-dimensional image to the three-dimensional fabrication apparatus 5.

The acquiring unit 151 acquires image data and height information of a three-dimensional image. Specifically, the acquiring unit 151 issues a request for the image data and the height information of the three-dimensional image to the information processing apparatus 200, and acquires the image data and the height information of the three-dimensional image from the information processing apparatus 200.

The color-information generating unit 153 generates color information indicating the color in each pixel of the three-dimensional image based on the image data of the three-dimensional image acquired by the acquiring unit 151. For example, the color-information generating unit 153 generates the color information by converting the color of the RGB image data acquired by the acquiring unit 151 to the CMYK image data. A well-known technique can be used for color conversion (color space conversion) from RGB to CMYK. However, because the generated color information is used for fabricating the three-dimensional image, processing unique to the fabrication of the three-dimensional image can be added.

Figure 13:
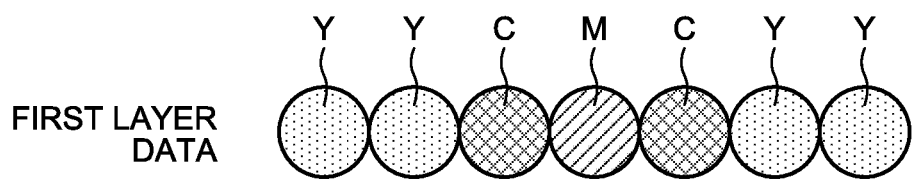
FIG. 13 is a diagram illustrating an example of color information according to the embodiment.
Figure 14:
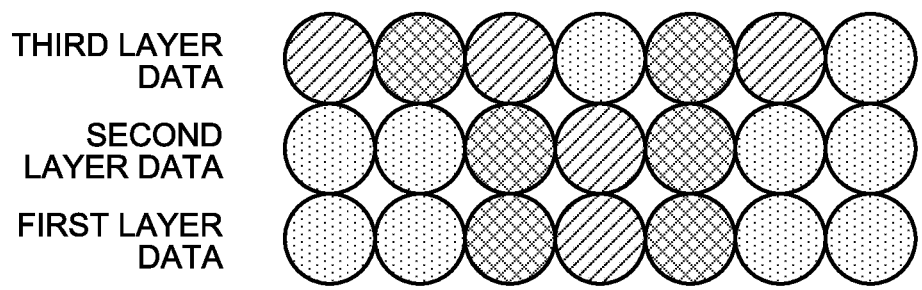
FIG. 14 is a diagram illustrating an example of the color information according to the embodiment.

FIGS. 13 and 14 are diagrams respectively illustrating an example of color information according to the present embodiment. In the present embodiment, as illustrated in FIG. 13, information for one layer is assumed as the color information. It is because, if the colors are overlapped at the time of layering, reproducibility of color is deteriorated. Accordingly, as illustrated in FIG. 14, when the pieces of color information for a plurality of layers are generated, only the color information for the first layer is basically used, and the color information for the second layer or higher is not used. That is, in the present embodiment, two-dimensional information is assumed as the color information (however, the color information is illustrated one-dimensionally in FIGS. 13 and 14).

In the example illustrated in FIG. 13, a reference character Y indicates a case where the color of the pixel (hereinafter, sometimes referred to as "dot") is yellow, a reference character C indicates a case where the color of the pixel is cyan, a reference character M indicates a case where the color of the pixel is magenta, and a reference character K indicates a case where the color of the pixel is black. In the following descriptions, it is assumed that the color of the pixel having the same pattern as the pixel with the reference character Y is yellow, the color of the pixel having the same pattern as the pixel with the reference character C is cyan, the color of the pixel having the same pattern as the pixel with the reference character M is magenta, and the color of the pixel having the same pattern as the pixel with the reference character K is black.

Figure 15:
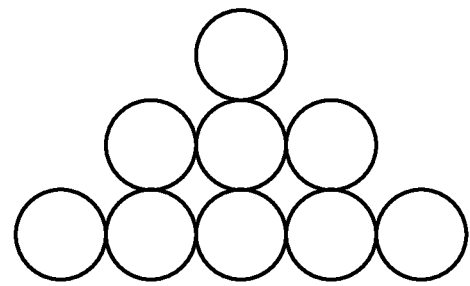
FIG. 15 is a diagram illustrating an example of the height information according to the embodiment.

FIG. 15 is a diagram illustrating an example of height information according to the present embodiment. In the present embodiment, as illustrated in FIG. 15, the height information is information of a plurality of layers. That is, in the present embodiment, the height information is three-dimensional information (however, the height information is illustrated two-dimensionally in FIG. 15), and as illustrated in FIG. 15, the height information mostly indicates a pyramid shape, designating the bottom as a base.

The layer-information generating unit 155 generates layer information (slice information) indicating arrangement of pixels for each layer for fabricating a three-dimensional image.

Figure 16:
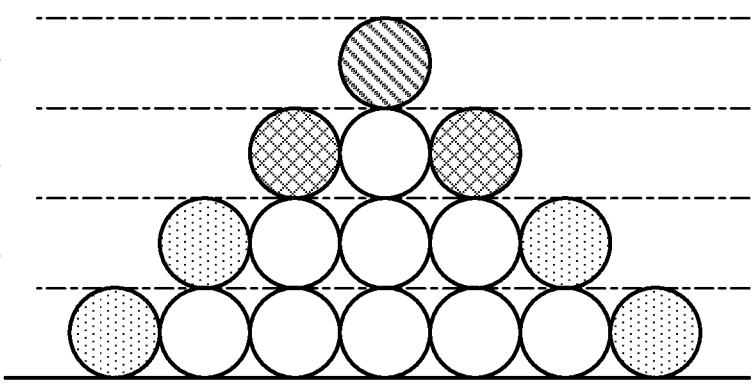
FIG. 16 is an explanatory diagram illustrating an example of a generating method of layer information according to the embodiment.

FIG. 16 is an explanatory diagram illustrating an example of a generating method of layer information according to the present embodiment. In the present embodiment, as illustrated in FIG. 16, the layer-information generating unit 155 generates three-dimensional image information that becomes a base of the layer information by arranging dots indicated by the color information generated by the color-information generating unit 153 on dots indicated by the height information. The layer-information generating unit 155 separates the three-dimensional image information for each layer to generate layer information (pieces of layer information for four layers in the example illustrated in FIG. 16) indicating arrangement of the pixels for each layer. Further, the layer-information generating unit 155 separates the generated layer information into shape layer information indicating arrangement of dots for a shape and color layer information indicating arrangement of dots for color. In the example illustrated in FIG. 16, the layer information on the top fourth layer is configured only by the color layer information.

The conveyance control unit 157 controls conveyance of a recording medium on which a three-dimensional image is fabricated by the head unit 15.

The movement control unit 159 controls movement of the head unit 15.

The fabrication unit 161 layers ultraviolet curable ink on the recording medium based on the layer information for each layer generated by the layer-information generating unit 155 to fabricate the three-dimensional image. The fabrication unit 161 uses the ultraviolet curable ink of different color from the color indicated by the color information for fabricating the shape of the three-dimensional image. In the present embodiment, it is assumed that the fabrication unit 161 uses white (W) ultraviolet curable ink for fabricating the shape of the three-dimensional image. However, the ink is not limited thereto, and clear (CL) ultraviolet curable ink can be used or the white (W) ultraviolet curable ink and the clear (CL) ultraviolet curable ink can be mixed and used.

In the present embodiment, the fabrication unit 161 layers the ultraviolet curable ink based on the color layer information, while delaying the layering by m layers (m is a natural number equal to or larger than 1) than the shape layer information for the same layer. Herein, a layering method in the case of m=1 is described by using the layer information illustrated in FIG. 16 as an example. However, the layering method is not limited thereto.

Figure 17:
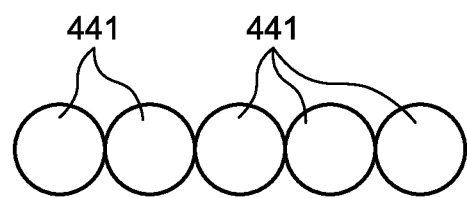
FIG. 17 is an explanatory diagram of an example of a fabrication method of a three-dimensional image according to the embodiment.

First, as illustrated in FIG. 17, the fabrication unit 161 deposits dots 441 indicated by the shape layer information for the first layer on the recording medium by using the white (W) ultraviolet curable ink.

Figure 18:
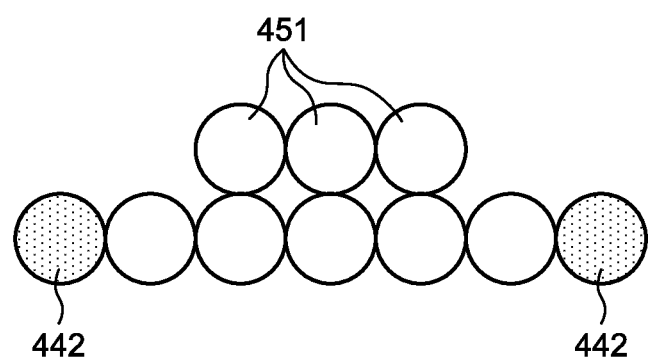
FIG. 18 is an explanatory diagram of an example of the fabrication method of the three-dimensional image according to the embodiment.

As illustrated in FIG. 18, the fabrication unit 161 then deposits dots 451 indicated by the shape layer information for the second layer on the dots 441 by using the white (W) ultraviolet curable ink, and deposits dots 442 indicated by the color layer information for first layer on the recording medium by using the yellow (Y) ultraviolet curable ink.

Figure 19:
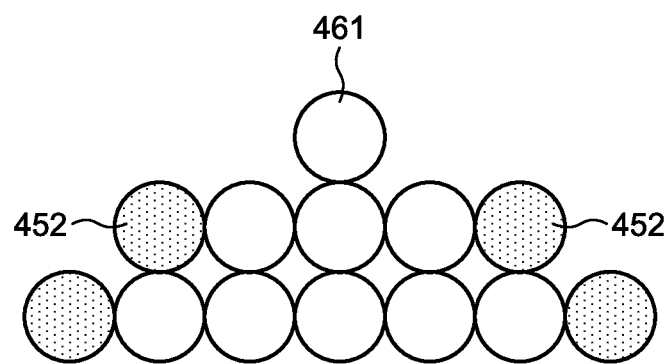
FIG. 19 is an explanatory diagram of an example of the fabrication method of the three-dimensional image according to the embodiment.

As illustrated in FIG. 19, the fabrication unit 161 then deposits dots 461 indicated by the shape layer information for the third layer on the dots 451 by using the white (W) ultraviolet curable ink, and deposits dots 452 indicated by the color layer information for the second layer on the dots 441 by using the yellow (Y) ultraviolet curable ink.

Figure 20:
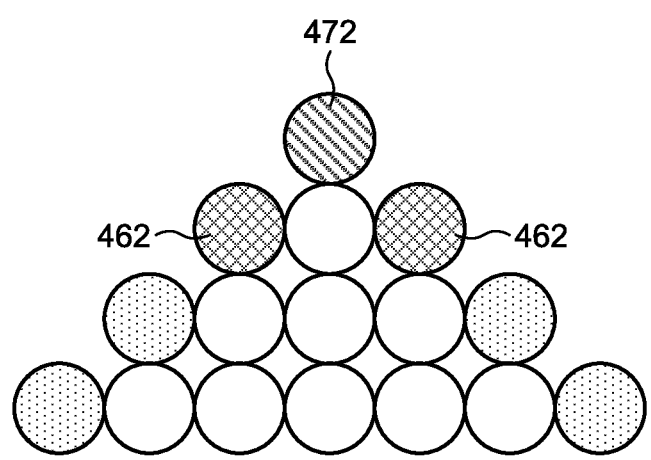
FIG. 20 is an explanatory diagram of an example of the fabrication method of the three-dimensional image according to the embodiment.

Lastly, as illustrated in FIG. 20, the fabrication unit 161 deposits dots 462 indicated by the color layer information for the third layer on the dots 451 by using the cyan (C) ultraviolet curable ink, and deposits dots 472 indicated by the color layer information for the fourth layer on the dots 461 by using the magenta (M) ultraviolet curable ink.

Figure 21:
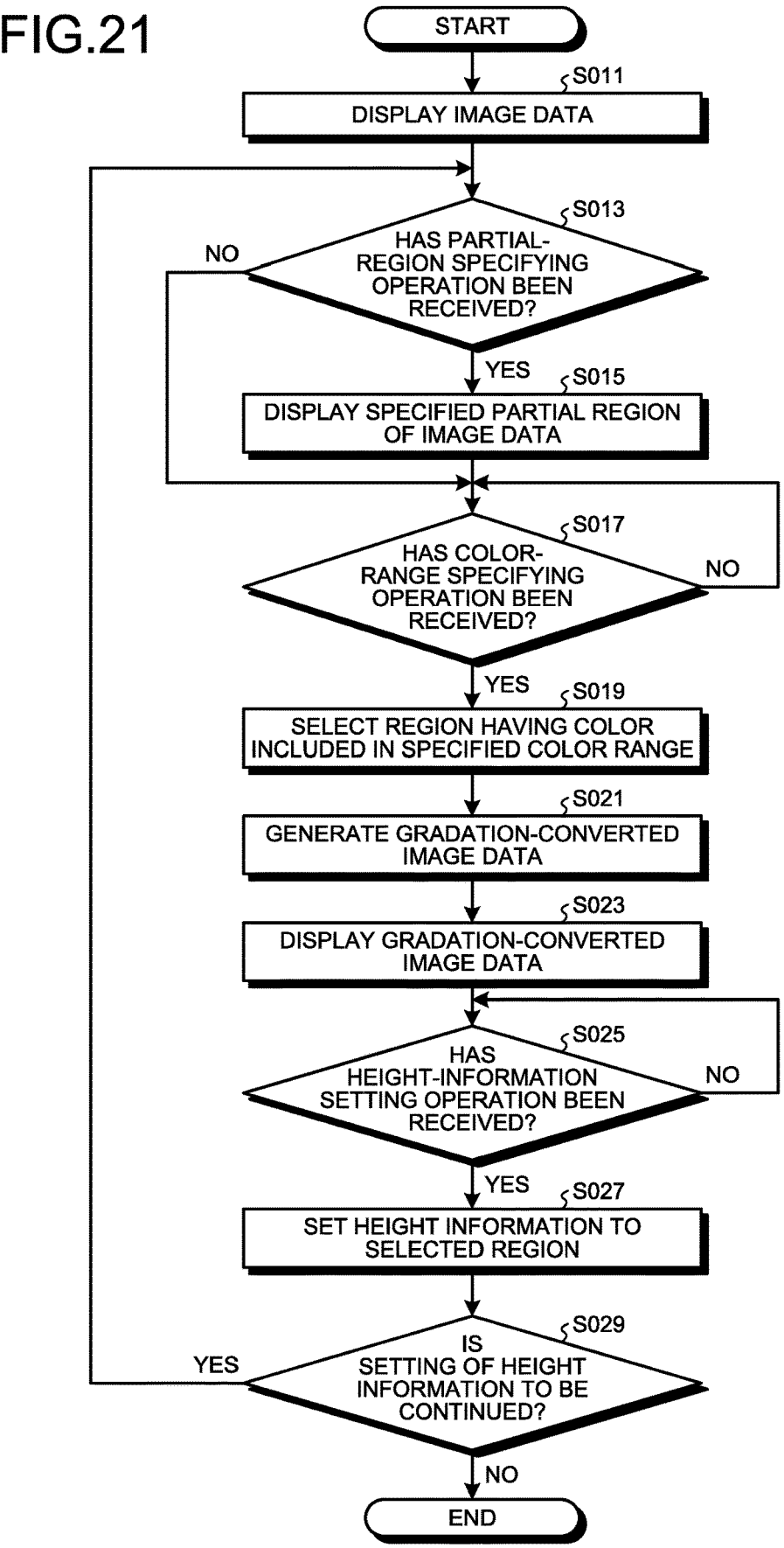
FIG. 21 is a flowchart illustrating an example of a flow of a height-information generation process procedure according to the embodiment.

FIG. 21 is a flowchart illustrating an example of a flow of a height-information generation process procedure according to the present embodiment.

First, when the receiving unit 255 receives specification of image data of a three-dimensional image for which the height information is to be generated, the display control unit 253 displays the specified image data in the regions 320 and 330 on the screen 301 (Step S011).

Subsequently, when the receiving unit 255 receives a partial-region specifying operation in order to specify a partial region in the image data displayed in the region 330 (YES at Step S013), the display control unit 253 displays in the region 330 the specified partial region of the image data displayed in the region 330 (Step S015).

When the receiving unit 255 does not receive the partial-region specifying operation (NO at Step S013), the process at Step S015 is not performed.

Subsequently, the receiving unit 255 waits until receiving a specifying operation of an arbitrary point in a region to which it is desired to add the height information and a color-range specifying operation in order to specify the color range in the three-dimensional color space that is based on the specified arbitrary point, in the image data displayed in the region 330 (NO at Step S017).

When the receiving unit 255 receives the color-range specifying operation (YES at Step S017), the selecting unit 257 selects a region having the color included in the specified color range on the image data of the three-dimensional image (Step S019).

The converting unit 259 then converts gradation of the image data of the three-dimensional image so that a gradation value in the region selected by the selecting unit 257 becomes high, to generate gradation-converted image data (Step S021).

Subsequently, the display control unit 253 displays the gradation-converted image data corresponding to the image data displayed in the region 320, in the region 360 on the screen 301, and displays the gradation-converted image data corresponding to the image data displayed in the region 330 on the screen 301, in the region 370 on the screen 301 (Step S023).

The receiving unit 255 then waits until receiving a height-information setting operation in order to set the height information in the region selected by the selecting unit 257 (NO at Step S025).

When the receiving unit 255 receives the height-information setting operation (YES at Step S025), the height-information setting unit 261 sets the height information to the region selected by the selecting unit 257 by using a method specified by the height-information setting operation (Step S027).

Subsequently, when setting of the height information is to be continued (YES at Step S029), the process returns to Step S013. When setting of the height information is finished (NO at Step S029), if there are a plurality of partial regions each including the region set with the height information, the height-information setting unit 261 integrates the pieces of height information set to the partial regions and designates the height information as the height information of the image data of the three-dimensional image.

Figure 22:
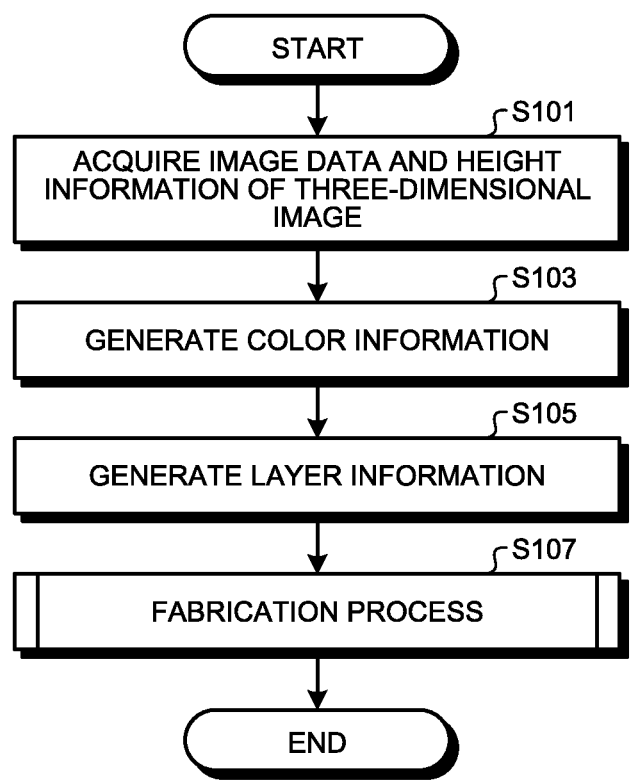
FIG. 22 is a flowchart illustrating an example of a flow of an output-object production process procedure according to the embodiment.

FIG. 22 is a flowchart illustrating an example of a flow of an output-object production process procedure according to the present embodiment.

First, the acquiring unit 151 acquires image data and height information of a three-dimensional image from the information processing apparatus 200 (Step S101).

The color-information generating unit 153 then generates color information indicating the color for each pixel of the three-dimensional image based on the image data of the three-dimensional image acquired by the acquiring unit 151 (Step S103).

Thereafter, the layer-information generating unit 155 generates layer information for each layer for fabricating the three-dimensional image based on the color information generated by the color-information generating unit 153 and the height information acquired by the acquiring unit 151 (Step S105).

Subsequently, the fabrication unit 161 layers ultraviolet curable ink on a recording medium based on the layer information for each layer generated by the layer-information generating unit 155 and performs a fabrication process for fabricating the corrected three-dimensional image (Step S107).

Figure 23:
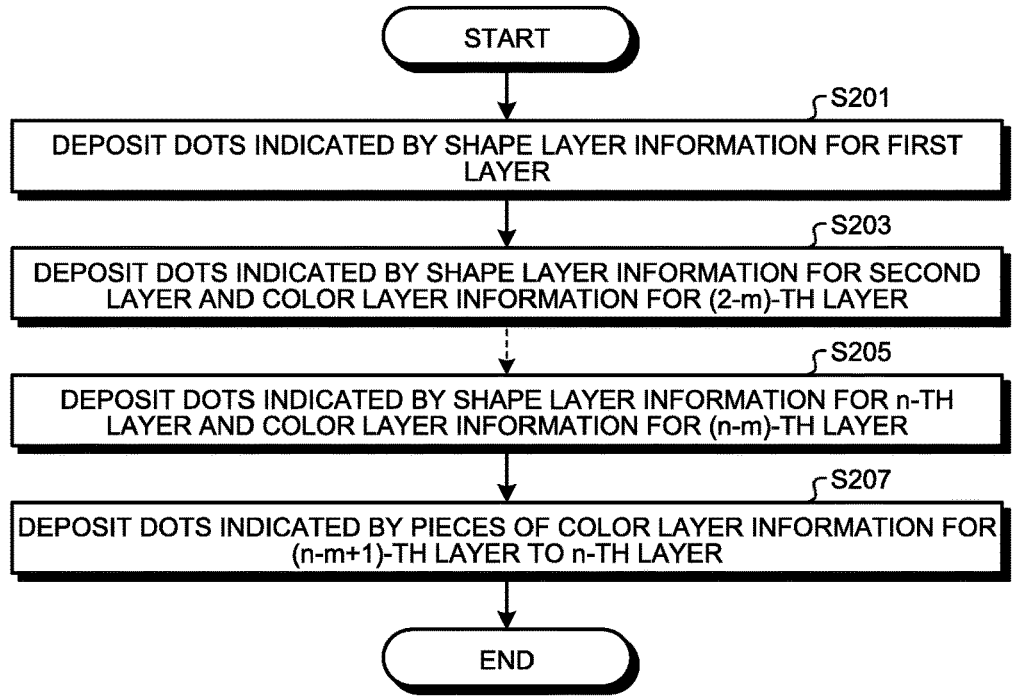
FIG. 23 is a flowchart illustrating an example of the fabrication process at Step S107 in the flowchart illustrated in FIG. 22.

FIG. 23 is a flowchart illustrating an example of the fabrication process at Step S107 in the flowchart illustrated in FIG. 22. In an example illustrated in FIG. 23, when i−m (i is a natural number equal to or larger than 2) is equal to or smaller than 0, it is assumed that layering of the ultraviolet curable ink based on the color layer information is not performed. Further, n is the topmost layer and m is a natural number equal to or larger than 1 as described above.

First, the fabrication unit 161 deposits dots indicated by the shape layer information for the first layer on the recording medium by using the ultraviolet curable ink (Step S201).

Subsequently, the fabrication unit 161 deposits dots indicated by the shape layer information for the second layer on the dots indicated by the shape layer information for the first layer by using the ultraviolet curable ink, and deposits dots indicated by the color layer information for the (2−m)-th layer on the recording medium (Step S203).

Thereafter, the fabrication unit 161 deposits dots indicated by the shape layer information for the i-th layer on the dots indicated by the shape layer information for the (i−1)-th layer by using the ultraviolet curable ink, and deposits dots indicated by the color layer information for the (1−m)-th layer on the recording medium or on the dots indicated by the shape layer information for the (i−m−1)-th layer, until i=n−1 is established. Here, i starts from 3 and the value is incremented each time the process is performed.

Subsequently, the fabrication unit 161 deposits dots indicated by the shape layer information for the n-th layer on the dots indicated by the shape layer information for the (n−1)-th layer by using the ultraviolet curable ink, and deposits dots indicated by the color layer information for the (n−m)-th layer on the dots indicated by the shape layer information for the (n−m−1)-th layer (Step S205).

Lastly, the fabrication unit 161 deposits the dots indicated by the color layer information for the (n−m+1)-th layer to the dots indicated by the color layer information for the n-th layer respectively on the dots indicated by the shape layer information for the (n−m)-th layer to the dots indicated by the shape layer information for the (n−1)-th layer by using the ultraviolet curable ink (Step S207).

As described above, according to the present embodiment, specification of an arbitrary point on image data is first received, and then specification of a color range in a three-dimensional color space adjusted based on the color (reference color) in the three-dimensional color space corresponding to the specified arbitrary point. Therefore, according to the present embodiment, the color range can be specified based on the color (reference color) in the three-dimensional color space in a region to which it is desired to set height information. Further, the specified color range can be easily approximated to a color range in the region to which it is desired to set the height information from the beginning. Accordingly, the region to which it is desired to set the height information on the image data can be easily selected.

Furthermore, according to the present embodiment, generation of the height information indicating an intricate shape becomes possible by repeating setting the height information to the selected region by specifying the color range and properly using the height-information setting method to set the height information. Accordingly, shape coincidence with an image imagined from a fabricated object that becomes a sample of a three-dimensional object to be fabricated and the image data, unevenness feeling, and color reproducibility can be acquired more easily.

Especially, according to the present embodiment, optimization of a partial shape of an image becomes possible by repeating setting the height information to the selected region by specifying the color range and properly using the height-information setting method to set the height information for each partial region and therefore generation of the height information indicating an intricate shape becomes possible. Accordingly, shape coincidence with an image imagined from a fabricated object that becomes a sample of a three-dimensional object to be fabricated and the image data, unevenness feeling, and color reproducibility can be acquired more easily.

Therefore, according to the present embodiment, the following problems in general three-dimensional fabrication can be solved.

(1) It is difficult to provide the unevenness feeling in an image having similar colors and a low contrast.

(2) In an image such as an illustration and a drawing configured by a complicated color at random, if shape data is generated only based on the hue information, brightness, and saturation, the unevenness feeling becomes too strong in the shape data and becomes too complicated, thereby decreasing shape coincidence with the three-dimensional fabricating object that is used as a basis for the data and the reproducibility.

(3) When there is no three-dimensional object that is used as a basis for the data and three-dimensional shape data is generated from two-dimensional image data, divergence may occur due to inconsistency of unevenness feeling between the image that can be imagined from the two-dimensional image data and the three-dimensional object.

(4) The inconsistency of unevenness feeling also affects shading due to unevenness to be apparent at the time of adding two-dimensional color data, thereby leading to a decrease in visual color reproducibility.

Further, according to the present embodiment, the color information is information for one layer. Therefore, at the time of fabricating a three-dimensional image, the ultraviolet curable ink formed as dots indicated by the color information is not overlapped and layered on the ultraviolet curable ink formed as dots indicated by other pieces of color information. Accordingly, the color reproducibility of the three-dimensional image can be improved.

Further, according to the present embodiment, as a delay decreases in layering of the ultraviolet curable ink based on the color layer information with respect to the shape layer information for the same layer, the discharge distance of the ultraviolet curable ink from the head unit 15 can be reduced, and thus the fabrication accuracy of the three-dimensional image can be improved.

Still further, according to the present embodiment, as the delay increases in layering of the ultraviolet curable ink based on the color layer information with respect to the shape layer information for the same layer, the number of times of emitting a curing light, which is ultraviolet rays, to the ultraviolet curable ink that forms the color such as yellow (Y), cyan (C), and magenta (M) can be decreased. Therefore, deterioration of the ultraviolet curable ink can be prevented, and the color reproducibility of the three-dimensional image can be further improved.

First Modification

In the embodiment described above, the inkjet method has been described. In a first modification, a mechanical configuration of a head unit 1015 when the fused deposition modeling is used is described.

Figure 24:
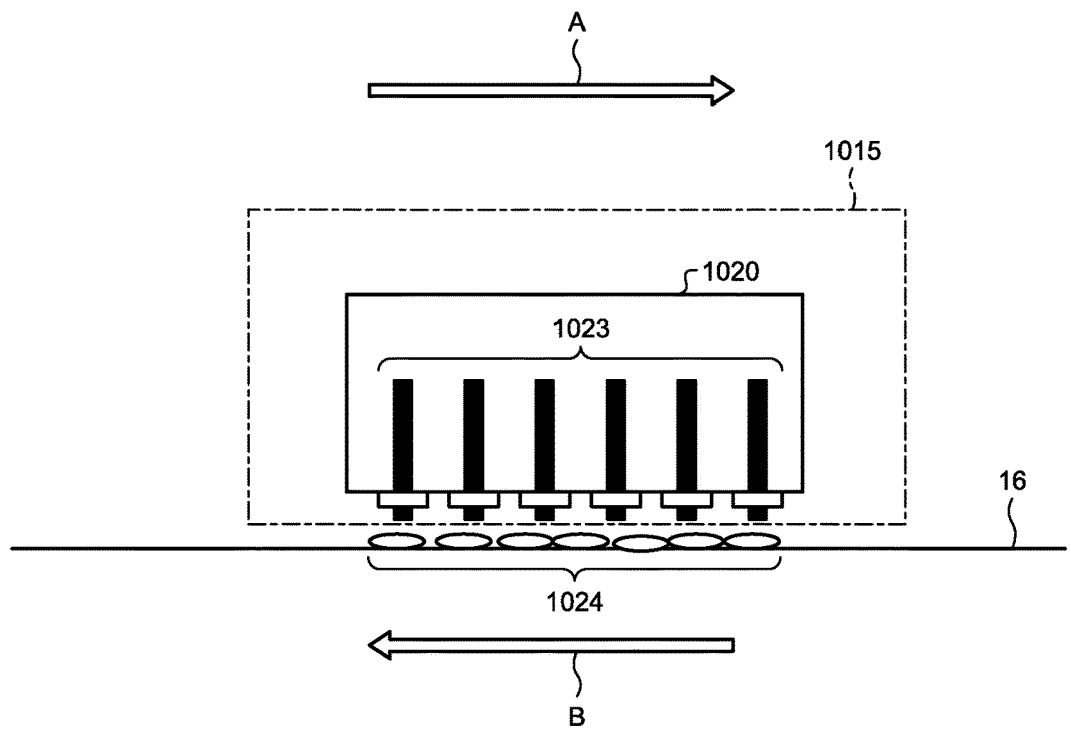
FIG. 24 is a schematic diagram illustrating an example of the mechanical configuration of a head unit according to a first modification.

FIG. 24 is a schematic diagram illustrating an example of the mechanical configuration of the head unit 1015 according to the first modification. As illustrated in FIG. 24, the head unit 1015 includes a fused (thermal) head 1020.

The fused head 1020 has fusion ink 1023, and by heating the fusion ink 1023, the fusion ink 1023 is output to a recording medium 16. The fusion ink 1023 is configured by fusion ink of white (W), clear (CL), yellow (Y), cyan (C), magenta (M), and black (K), as in the inkjet method.

Second Modification

In the embodiment described above, the case where the fabrication unit 161 uses the ultraviolet curable ink of the color different from the color indicated by the color information for fabricating a shape of a three-dimensional image has been described. However, the ultraviolet curable ink of the color different from the color indicated by the color information can be used for fabricating of a portion on which the color indicated by the color information is layered, of the shape of the three-dimensional image, and ultraviolet curable ink of any color can be used for fabricating of portions other than the portion. By this method, the fabricating speed of the three-dimensional image can be improved, while improving the color reproducibility of the three-dimensional image.

Third Modification

In the embodiment described above, the case where the entire surface portion of the three-dimensional image is covered with colors indicated by the color information has been described. However, in the case where a portion of the surface portion of the three-dimensional image is colored, it is sufficient to cover the portion of the surface portion of the three-dimensional image to be colored is covered with the color indicated by the color information.

Fourth Modification

In the embodiment described above, the case where generation of the layer information is performed by the controller 100 has been described as an example. However, the information processing apparatus 200 can perform the process up to generation of the layer information. In this case, it suffices the color-information generating unit 153 and the layer-information generating unit 155 are provided in the information processing apparatus 200, and the acquiring unit 151 acquires the layer information from the information processing apparatus 200.

Furthermore, in the embodiment described above, the case where the information processing apparatus 200 generates the height information has been described as an example. However, the three-dimensional fabrication apparatus 5 (the controller 100) can generate the height information. In this case, it suffices that the three-dimensional fabrication apparatus 5 has the configuration of the information processing apparatus 200. Further, when the three-dimensional fabrication apparatus 5 (the controller 100) generates the height information, only the user interface (only operation input and screen display) is performed by the information processing apparatus 200, and the three-dimensional fabrication apparatus 5 (the controller 100) can perform other processes.

Program

The program executed in the information processing apparatus 200 and the three-dimensional fabrication apparatus 5 according to the embodiment and the respective modifications described above can be stored in a computer-readable recording medium, such as a CD-ROM, a CD-R, a memory card, a DVD (Digital Versatile Disk), a flexible disk (FD), and the like, as a file of an installable format or an executable format and provided.

Furthermore, the program executed in the information processing apparatus 200 and the three-dimensional fabrication apparatus 5 according to the embodiment and the respective modifications described above can be stored in a computer connected to a network such as the Internet, and then downloaded via the network, to be provided, or the program can be provided or distributed via a network such as the Internet. The program executed in the information processing apparatus 200 and the three-dimensional fabrication apparatus 5 according to the embodiment and the respective modifications described above can be incorporated in advance in a ROM or the like and provided.

The program to be executed in the information processing apparatus 200 and the three-dimensional fabrication apparatus 5 according to the embodiment and the respective modifications described above has a module configuration for realizing the respective units described above on a computer. As actual hardware, the respective functional units described above are realized on a computer, for example, by reading the program from a ROM onto a RAM and executing it by a CPU.

According to the present invention, it is possible to easily select a region to which it is desired to set height information on image data.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. An information processing apparatus, comprising:
    at least one processor, configured to
        control display of image data on a display;
        receive specification of an arbitrary point on the image data displayed and specification of a color range in a three-dimensional color space based on the arbitrary point specified;
        automatically select a region having color information included in the color range specified on the image data; and
        set height information to the region automatically selected, wherein the height information is expressed relative to the color information, such that as the height information is relatively higher, the color information is relatively darker, and such that as the height information is relatively lower, the color information is relatively lighter; and
        generate layer information, including the height information in a relatively middle area of the layer information generated and including the color information in a relatively peripheral area of the layer information generated.

2. The information processing apparatus of claim 1, wherein the at least one processor is configured to
    control display of the color information, corresponding to the arbitrary point specified, on the display, and
    wherein the color range is a range in the three-dimensional color space, adjusted based on the color information displayed on the display.

3. The information processing apparatus of claim 1, wherein
    each time the specification of the color range is received, the region on the image data is selected, and
    each time the region is selected, the height information is set to the region selected.

4. The information processing apparatus of claim 1, wherein the at least one processor is configured to
    receive specification of a partial region in the image data displayed,
    display the specified partial region on the display,
    receive specification of the arbitrary point on the partial region displayed and receives specification of the color range, and
    select the region on the partial region displayed.

5. The information processing apparatus of claim 4, wherein
    each time the specification of the color range is received, the region on the image data is selected, and
    each time the region is selected, the height information is set to the region selected.

6. The information processing apparatus of claim 4, wherein
    each time the specification of the partial region is received, the partial region specified is displayed on the display,
    each time the partial region is displayed, specification of the arbitrary point is received and specification of the color range, on the partial region displayed, is received,
    each time the specification of the color range is received, the region on the partial region is selected, and
    each time the region on the partial region is selected, the height information is set to the region selected.

7. The information processing apparatus of claim 6, wherein upon the partial region, including the region set with the height information, being present in plural, pieces of the height information set to the partial regions are integrated.

8. The information processing apparatus of claim 1, wherein the at least one processor is further configured to
    convert gradation of the image data so that a gradation value in the region selected becomes relatively higher, so as to generate gradation-converted image data, wherein
    control display of the gradation-converted image data on the display,
    receive specification of an apex in the region selected on the gradation-converted image data displayed and receive specification of a height of the apex, and
    set the height information to the region selected based on a first height-deciding logic for deciding a height around the apex based on the height of the apex.

9. The information processing apparatus of claim 1, wherein the at least one processor is further configured to
    convert gradation of the image data so that a gradation value in region selected becomes relatively higher, so as to generate gradation-converted image data, and
    set the height information to the region selected based on a second height-deciding logic for deciding a height corresponding to an arbitrary gradation value.

10. The information processing apparatus of claim 1, wherein the at least one processor is further configured to
    receive specification of a height with respect to the region selected, and set height information indicating the height specified to a whole of the region selected.

11. A three-dimensional fabrication apparatus comprising:
at least one processor, configured to
control display of image data on a display;
receive specification of an arbitrary point on the image data displayed and specification of a color range in a three-dimensional color space based on the arbitrary point specified;
automatically select a region having color information included in the color range specified on the image data;
set height information to the region automatically selected; and
generate layer information including the height information in a relatively middle area of the layer information and the color information in a relatively peripheral area of the layer information; and
a three-dimensional fabricator, configured to fabricate a three-dimensional image by three-dimensionally forming an image indicated by the image data based on the height information, the color information and the image data, wherein the height information is expressed relative to the color information, as the height information is relatively higher as the color information is relatively darker, and the height information is relatively lower as the color information is relatively lighter.

12. A three-dimensional fabrication system comprising:
an information processing apparatus; and
a three-dimensional fabrication apparatus, wherein
the information processing apparatus includes
at least one processor, configured to
control display of image data on a display,
receive specification of an arbitrary point on the image data displayed and specification of a color range in a three-dimensional color space based on the arbitrary point specified,
automatically select a region having color information included in the color range specified on the image data,
set height information to the region automatically selected, and
generate layer information including the height information in a relatively middle area of the layer information and the color information in a relatively peripheral area of the layer information; and
the three-dimensional fabrication apparatus includes
a three-dimensional fabricator, configured to fabricate a three-dimensional image by three-dimensionally forming an image indicated by the image data based on the height information, the color information and the image data, wherein the height information is expressed relative to the color information, as the height information is relatively higher as the color information is relatively darker, and the height information is relatively lower as the color information is relatively lighter.

13. The information processing apparatus of claim 8, wherein an inclination of the image data in the three-dimensional color space becomes relatively steeper as the height of the apex becomes relatively higher.

14. The information processing apparatus of claim 8, wherein an inclination of the image data in the three-dimensional color space becomes relatively gentler as the height of the apex becomes relatively lower.

15. The three-dimensional fabrication apparatus of claim 11, wherein the at least one processor is configured to
control display of the color information, corresponding to the arbitrary point specified, on the display, and
wherein the color range is a range in the three-dimensional color space, adjusted based on the color information displayed on the display.

16. The three-dimensional fabrication apparatus of claim 11, wherein
each time the specification of the color range is received, the region on the image data is selected, and
each time the region is selected, the height information is set to the region selected.

17. The three-dimensional fabrication apparatus of claim 11, wherein the at least one processor is further configured to
convert gradation of the image data so that a gradation value in the region selected becomes relatively higher, so as to generate gradation-converted image data, wherein
control display of the gradation-converted image data on the display,
receive specification of an apex in the region selected on the gradation-converted image data displayed and receive specification of a height of the apex, and
set the height information to the region selected based on a first height-deciding logic for deciding a height around the apex based on the height of the apex.

18. The three-dimensional fabrication system of claim 12, wherein the at least one processor is configured to
control display of the color information, corresponding to the arbitrary point specified, on the display, and
wherein the color range is a range in the three-dimensional color space, adjusted based on the color information displayed on the display.

19. The three-dimensional fabrication system of claim 12, wherein
each time the specification of the color range is received, the region on the image data is selected, and
each time the region is selected, the height information is set to the region selected.

20. The three-dimensional fabrication system of claim 12, wherein the at least one processor is further configured to
convert gradation of the image data so that a gradation value in the region selected becomes relatively higher, so as to generate gradation-converted image data, wherein
control display of the gradation-converted image data on the display,
receive specification of an apex in the region selected on the gradation-converted image data displayed and receive specification of a height of the apex, and
set the height information to the region selected based on a first height-deciding logic for deciding a height around the apex based on the height of the apex.

* * * * *